United States Patent
Elsawy et al.

(10) Patent No.: US 11,787,713 B1
(45) Date of Patent: Oct. 17, 2023

(54) LOW COST TECHNOLOGY MUNICIPAL WASTEWATER TREATMENT FOR SAFE IRRIGATION REUSE

(71) Applicant: KING FAISAL UNIVERSITY, Al-Ahsa (SA)

(72) Inventors: Hany Amin Elsawy, Al-Ahsa (SA); Azza Mahmoud Sedky, Al-Ahsa (SA); Esawy Mahmoud, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/202,094

(22) Filed: May 25, 2023

(51) Int. Cl.
| | |
|---|---|
| *C02F 1/52* | (2023.01) |
| *B01J 20/20* | (2006.01) |
| *B01J 20/28* | (2006.01) |
| *C02F 3/10* | (2023.01) |
| *C02F 101/20* | (2006.01) |
| *C02F 101/30* | (2006.01) |
| *C02F 103/30* | (2006.01) |

(52) U.S. Cl.
CPC ............ *C02F 1/5236* (2013.01); *B01J 20/20* (2013.01); *B01J 20/28011* (2013.01); *C02F 1/5281* (2013.01); *C02F 3/106* (2013.01); *C02F 3/108* (2013.01); *C02F 2101/20* (2013.01); *C02F 2101/306* (2013.01); *C02F 2101/308* (2013.01); *C02F 2103/30* (2013.01); *C02F 2303/04* (2013.01); *C02F 2303/18* (2013.01)

(58) Field of Classification Search
None
See application file for complete search history.

(56) References Cited

U.S. PATENT DOCUMENTS

| | | | | |
|---|---|---|---|---|
| 11,136,249 | B1* | 10/2021 | Al-Risheq | ............ C02F 1/5263 |
| 2005/0224413 | A1* | 10/2005 | Nguyen | ................ B01J 47/016 |
| | | | | 210/695 |
| 2006/0006114 | A1* | 1/2006 | Deskins | ................ B01D 21/02 |
| | | | | 210/793 |
| 2006/0006115 | A1* | 1/2006 | Hsien | .................... C02F 1/5245 |
| | | | | 210/726 |
| 2007/0092433 | A1* | 4/2007 | Janak | .................... C02F 1/5245 |
| | | | | 423/467 |

(Continued)

FOREIGN PATENT DOCUMENTS

WO   2021/251811 A1   12/2021

OTHER PUBLICATIONS

Amany F. Hasaballah, et al., "Cement kiln dust as an alternative technique for wastewater treatment"; Ain Shams Engineering Journal vol. 12, Issue 4, Dec. 2021, pp. 4201-4209, https://doi.org/10.1016/j.asej.2021.04.026.

(Continued)

*Primary Examiner* — Chester T Barry
(74) *Attorney, Agent, or Firm* — Nath, Goldberg & Meyer; Richard C. Litman

(57) ABSTRACT

Decontamination of water using low-cost technology for municipal wastewater treatment for safe irrigation reuse is provided. More specifically, wastewater is decontaminated by coagulation/flocculation followed by biological filtration while incorporating, in several stages, wastes from other industries such as ceramic kiln dust and biochar. Ceramic kiln dust and alum are used in a coagulation/flocculation process which is then followed by biofiltration using a biochar material.

19 Claims, 1 Drawing Sheet

(56) References Cited

U.S. PATENT DOCUMENTS

| | | | |
|---|---|---|---|
| 2008/0017558 A1* | 1/2008 | Pollock | C02F 3/1273 |
| | | | 210/90 |
| 2013/0334143 A1* | 12/2013 | Song | C02F 1/5236 |
| | | | 210/208 |
| 2014/0131272 A1* | 5/2014 | Josse | C02F 11/04 |
| | | | 210/195.3 |
| 2015/0144564 A1 | 5/2015 | Moller et al. | |
| 2019/0084843 A1 | 3/2019 | Möller et al. | |
| 2021/0269331 A1* | 9/2021 | Anderson | B03D 3/06 |
| 2022/0169577 A1 | 6/2022 | Malyala et al. | |

OTHER PUBLICATIONS

Danny Pui Wei Sheng, et al., "Assessment and Optimization of Coagulation Process in Water Treatment Plant: A Review", ASEAN Journal of Science and Engineering, ASEAN Journal of Science and Engineering 3(1) (2023) 79-100, First available online May 28, 2022, Publication date Mar. 1, 2023.

J. M. Patra, et al., "Biochar as a low-cost adsorbent for heavy metal removal: A review", International Journal of Research in Biosciences, vol. 6 Issue 1, pp. (1-7), Jan. 2017, Available online at http://www.ijrbs.in, ISSN 2319-2844.

* cited by examiner

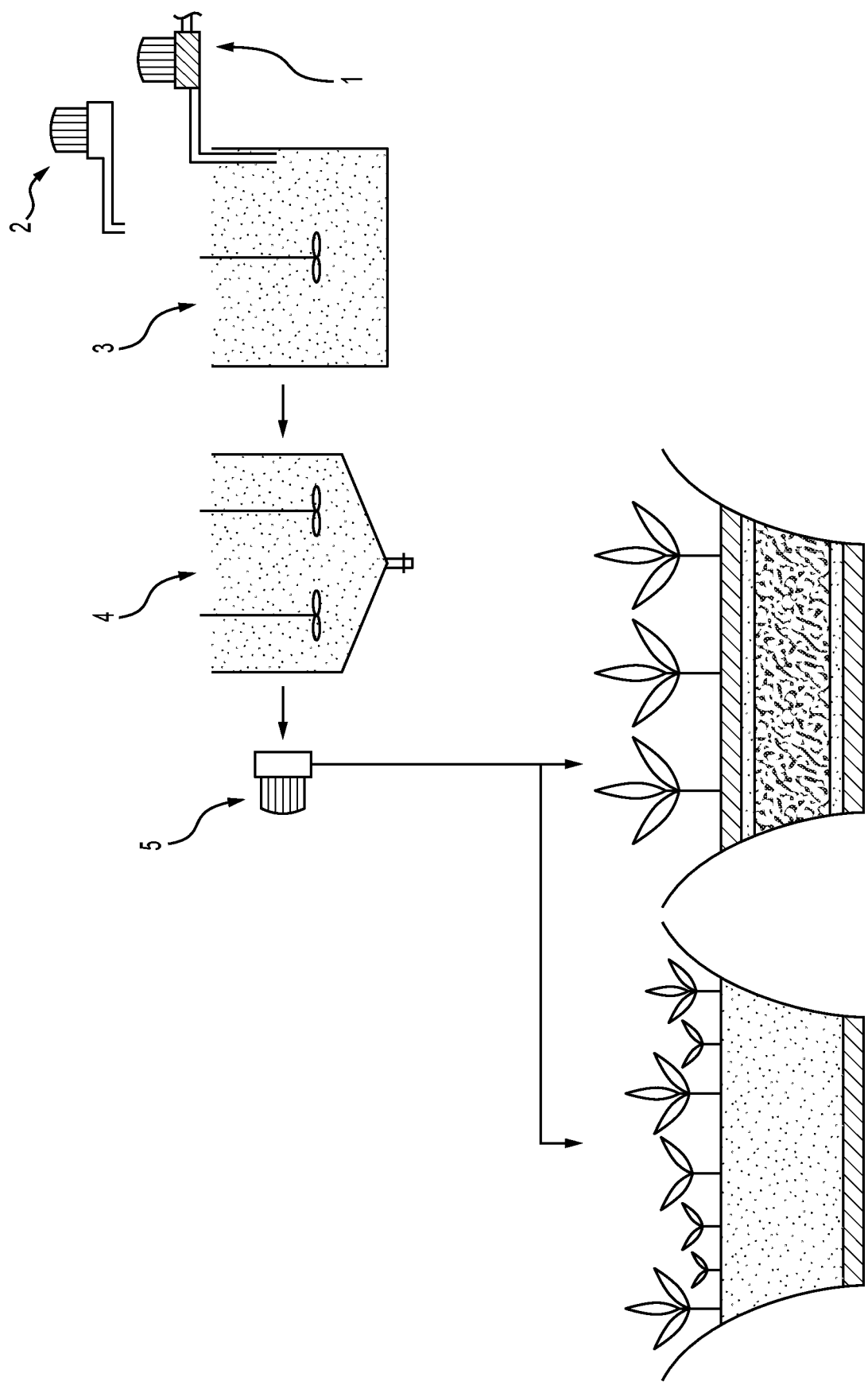

LOW COST TECHNOLOGY MUNICIPAL WASTEWATER TREATMENT FOR SAFE IRRIGATION REUSE

BACKGROUND

1. Field

The disclosure of the present patent application relates generally to low-cost technology for municipal wastewater treatment for safe irrigation reuse. More specifically, wastewater is decontaminated by coagulation/flocculation followed by biological filtration.

2. Description of the Related Art

Climate changes around the world have led to drought, desertification, and other disasters. One of the most important problems is water scarcity and the acute shortage of freshwater resources. In recent years, the available quota of water per capita has decreased to 663 cubic meters per year, while the United Nations has set a baseline figure of 1,000 cubic meters of water per capita per year. When a country dips below this line, it is considered water poor. Therefore, wastewater must be reused for irrigation for many countries to be able to reach this goal, but the wastewater typically contains toxic organic and inorganic pollutants and pathogens that affect public health and exceed the permissible limits for irrigation.

Additionally, the textile industry is one of the largest consumers of water (800-1000 $m^3$ ton-1) and liquid sewage generators. Liquid waste from the textile industry is complex, containing a wide variety of products, such as dyes, detergents, humectants, and oxidants. These products are highly toxic and carcinogenic to fora and fauna as well as humans. In the past decade, wastewater that is discharged by dye manufacturing and textile industries has become an environmental concern. In many countries legal requirements for the discharge of contaminated wastewater have been strengthened.

Ceramic kiln dust (CKD) is a fine powdery material collected from kiln exhaust gases during the manufacture of Portland cement (PC). The generation of CKD is approximately 30 million tons worldwide per year. CKD is considered a hazardous material and has a high cost for disposal. Recently, the use of CKD as adsorbents in wastewater treatment has been of interest to effectively remove mineral contaminants from industrial wastewater.

Therefore, it would be desirable to decontaminate wastewater for reuse in irrigation by using simple and cheap techniques that also incorporate the use of agricultural and industrial wastes.

SUMMARY

The disclosure of the present application relates to decontamination of wastewater for irrigation, which specifically combines or integrates coagulation and/or flocculation by cement kiln dust (CKD) and low dose alum followed by biological filtration using a biochar filter. The use of the biochar permits direct contact between microorganisms embedded in polymeric matrices and water pollutants, thus promoting their reduction to obtain pure irrigation water.

In the first water decontamination stage, toxic substances that affect living organisms are disposed of, and in the second stage, the rest of the pollutants are disposed of to obtain pollutant-free water that can be reused for irrigation.

Wastewater from the textile industry may be taken as an example of wastewater that may be treated and decontaminated for reuse in irrigation. It is encompassed within the scope of the present subject matter that any similar wastewater may be treated herein.

At the same time, waste from other industries may be used in the process of treating and decontaminating the municipal wastewater. Examples of said waste may include certain agricultural and industrial wastes such as ceramic kiln dust (CKD) and biochar.

In this regard, in an embodiment, the present subject matter relates to a system for decontaminating wastewater, the system comprising: a feed pump configured to introduce wastewater containing contaminants to be treated by decontamination; a first tank having a first mixing mechanism, said first tank configured to receive and contain the wastewater from the feed pump; a dosing system configured for introducing treatment chemicals into the first tank containing the wastewater, wherein the first mixing mechanism is configured to mix the treatment chemicals with the wastewater at a first, rapid mixture speed to obtain a mixture; a second tank having a second mixing mechanism and configured to receive, contain, and mix the mixture from the first tank at a second, lower mixture speed to flocculate, coagulate, and remove at least a portion of the contaminants from the mixture, thereby obtaining a treated wastewater; an exit pump connected to the second tank configured to irrigate or distribute the treated wastewater to a desired location; and a biofilter for biofiltering the treated wastewater to remove any remaining contaminants and the treatment chemicals to produce decontaminated water.

In another embodiment, the present subject matter relates to a method for decontaminating wastewater, the method comprising: adding wastewater comprising contaminants to a first tank; mixing treatment chemicals with the wastewater at a first, rapid mixture speed to obtain a mixture; transferring the mixture to a second tank; mixing the mixture in the second tank at a second, lower mixture speed to flocculate, coagulate, and remove at least a portion of the contaminants from the mixture, thereby obtaining a treated wastewater; biofiltering any remaining contaminants from the treated wastewater; and obtaining decontaminated water.

These and other features of the present subject matter will become readily apparent upon further review of the following specification.

BRIEF DESCRIPTION OF THE DRAWINGS

FIG. 1 shows a system for decontamination of wastewater using coagulation and flocculation integrated with biofiltration.

DETAILED DESCRIPTION OF THE PREFERRED EMBODIMENTS

The following definitions are provided for the purpose of understanding the present subject matter and for construing the appended patent claims.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter. For this particular subject matter, "low" is meant to encompass a range of about more than 0% up to about 30%.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The disclosure of the present application relates to decontamination of wastewater for irrigation, which specifically combines or integrates coagulation/flocculation by cement kiln dust (CKD) and low dose alum followed by biological filtration (biochar filter). The use of the biochar permits direct contact between microorganisms embedded in polymeric matrices and water pollutants, thus promoting their reduction to obtain pure irrigation water.

In this regard, in an embodiment, the present subject matter relates to a system for decontaminating wastewater, the system comprising: a feed pump configured to introduce wastewater containing contaminants to be treated by decontamination; a first tank having a first mixing mechanism, said first tank configured to receive and contain the wastewater from the feed pump; a dosing system configured for introducing treatment chemicals into the first tank containing the wastewater, wherein the first mixing mechanism is configured to mix the treatment chemicals with the wastewater at a first, rapid mixture speed to obtain a mixture; a second tank having a second mixing mechanism and configured to receive, contain, and mix the mixture from the first tank at a second, lower mixture speed to flocculate, coagulate, and remove at least a portion of the contaminants from the mixture, thereby obtaining a treated wastewater; an exit pump connected to the second tank configured to irrigate or distribute the treated wastewater to a desired location; and a biofilter for biofiltering the treated wastewater to remove any remaining contaminants and the treatment chemicals to produce decontaminated water.

In an embodiment, the treatment chemicals provided as a part of the present system can comprise cement kiln dust (CKD) and alum. Similarly, the biofiltering of the treated wastewater can be conducted by biochar filtration and use of cement kiln dust (CKD) remaining in the treated wastewater after it had been previously introduced.

In another embodiment, in the first and second tanks, the removed contaminants are toxic substances that affect living organisms. In certain aspects, the removed contaminants can be selected from the group consisting of heavy metals, organic materials, pathogens, suspended solids, pesticides, any other toxic materials, and any combination thereof.

In certain embodiments, in the first tank, the cement kiln dust (CKD) is mixed in with the wastewater and rapidly mixed for about 2 minutes, and alum is added for about 2 minutes of rapid mix as well. The mixture is then transitioned to the second tank, where mixing is done using a slow mixer for about 30 minutes. As a result, flocs are formed, and sedimentation of flocculent materials occurs.

In a further embodiment, the biochar filtration comprises the use of microorganisms fixed to a porous medium to break down the remaining contaminants.

In another embodiment, the present subject matter relates to a method for decontaminating wastewater, the method comprising: adding wastewater comprising contaminants to a first tank; mixing treatment chemicals with the wastewater at a first, rapid mixture speed to obtain a mixture; transferring the mixture to a second tank; mixing the mixture in the second tank at a second, lower mixture speed to flocculate, coagulate, and remove at least a portion of the contaminants from the mixture, thereby obtaining a treated wastewater; biofiltering any remaining contaminants from the treated wastewater; and obtaining decontaminated water.

In this regard, the present methods can further comprise using the decontaminated water for irrigation. In the alternative, the present methods can further comprise storing the decontaminated water for later use.

In one embodiment of the present methods, the treatment chemicals can comprise cement kiln dust (CKD) and alum. In this regard, the alum and ceramic kiln dust are used for the coagulating and flocculating at least a portion of the contaminants. Further, the present methods can comprise reducing at least a portion of the contaminants in the treated wastewater using the ceramic kiln dust (CKD) to adsorb and precipitate the contaminants in the treated wastewater. Similarly, the biofiltering of the treated wastewater can be conducted by biochar filtration and using cement kiln dust (CKD) remaining in the treated wastewater after it had been previously introduced.

In another embodiment of the present methods, in the first and second tanks, the removed contaminants are toxic substances that affect living organisms. In this regard, the removed contaminants can be selected from the group consisting of heavy metals, organic materials, pathogens, suspended solids, pesticides, any other toxic materials, and any combination thereof.

In a further embodiment of the present methods, the biochar filtration comprises the use of microorganisms fixed to a porous medium to break down the remaining contaminants. In this regard, the biochar can comprise the microorganisms embedded in polymer matrices.

In an embodiment, in the first water decontamination stage, toxic substances that affect living organisms are disposed of, and in the second stage, the rest of the pollutants are disposed of to obtain pollutant-free water that can be reused for irrigation. Wastewater from the textile industry may be taken as an example of wastewater that may be treated and decontaminated for reuse in irrigation. It is encompassed within the scope of the present subject matter that any similar wastewater may be treated herein.

At the same time, waste from other industries may be used in the process of treating and decontaminating the municipal wastewater. Examples of said waste may include certain agricultural and industrial wastes such as ceramic kiln dust (CKD) and biochar.

Textile wastewater has a high pH value, high concentration of suspended solids, chlorides, nitrates, metals like manganese, sodium, lead, copper, chromium, iron, and high biochemical oxygen demand (BOD) and chemical oxygen demand (COD) value, and heavy metals such as lead (Pb), chromium (Cr), cadmium (Cd) and copper (Cu) are widely used for production of color pigments of textile dyes. Textile industry wastewater also contains potential sources of hydrophilic colloids which include proteins, starches, soaps, and others that have been used in the different unit operations of fabric and dyeing processes. Colloids are very low diameter particles which are responsible for the turbidity or the color of surface water. Because of their very low sedimentation speed the best way to eliminate them is the coagulation/flocculation processes.

Coagulation flocculation with alum (aluminum sulfate, also known as potassium alum or potash alum for potassium aluminum sulfate) includes a process where aluminum hydroxide $(Al(OH)_2)$ precipitates, forming a "sweepfloc" (large aggregates of mineral salt hydroxides) that tends to capture suspended solids as they settle out of suspension. The pH of the water plays an important role when alum is used for coagulation because the solubility of the aluminum species in water is pH dependent. The overall coagulation and flocculation process involves three steps: (i) destabilization begins after the operational solubility limit of aluminum hydroxide has been exceeded; (ii) aluminum hydroxide species are then deposited onto colloidal surfaces; (iii) under typical conditions, the aluminum hydroxide is positively charged, while the original colloidal particles are negatively charged. Heavy metals can then be reduced in the treated wastewater by ceramic kiln dust (CKD), perhaps due to adsorption/precipitation reactions.

Reduction of heavy metals by CKD may be attributed to adsorption of heavy metals on calcium carbonate existing in ceramic kiln dust (CKD). In the formation of surface metal-complexes, these complexes may be formed due to the interaction of metal with surface sites of oxides such as Fe—OH, Al—OH and Si—OH that are found in CKD and may also be reduced by precipitation with high pH and $CaCO_3$. These sites can interact with heavy metals and other pollutants, including by way of non-limiting example pesticides, dyes and the like, making them unavailable. The biochemical oxygen demand (BOD) and chemical oxygen demand (COD) adsorption mechanism is complicated, and although the attraction is primarily physical, there is a combination of physical, chemical, and electrostatic interactions between the CKD and the organic compounds. CKD can reduce the organic material concentrations and remove pathogens and suspended solids from raw wastewater.

In certain embodiments, the CKD and alum may be added to the wastewater at a dose of about 40 to about 60 $g/m^3$, or about 50 $g/m^3$.

In biological filtration, microorganisms fixed to a porous medium are used in the biofiltration process to break down pollutants present in the wastewater stream. The microorganisms grow in a biofilm on the surface of the porous medium or are suspended in the water phase surrounding the porous medium particles. In certain embodiments, a filter bed medium can comprise relatively inert substances, which ensures large surface attachment areas and additional nutrient supply to allow the biofiltration process to proceed.

During the biofiltration, the removal of the suspended solids, colors, and chemical oxygen demand (COD) are accomplished by a complex process involving one or more filtration or filtration-related mechanisms such as straining, sedimentation, interception, impaction, and adsorption. For example, the main method of Pb (II) adsorption by digested cow dung biochar is surface precipitation. The adsorption mechanisms for heavy metals by biochar can involve electrostatic attraction, precipitation on biochar, and formation of complexes between metals and functional groups on biochar. Heavy metal sorption by biochar can mostly occur through the formation of surface complexes between these metals and —OH or —COOH groups.

In this regard, the biofiltration is conducted using the biochar. The biofiltration is preceded by the addition of the cement kiln dust (CKD) in the coagulation/flocculation processes, which removed heavy metals and other pollutants that are harmful to the growth of microorganisms growing on the biochar. The biochar is highly effective for removing various contaminants present in the wastewater stream, including pathogenic organisms, inorganic materials such as heavy metals, and organic pollutants such as dyes.

In one embodiment, the biochar used for the biofiltration step of the present methods can be black, highly porous, lightweight, fine-grained, and have a large surface area. Almost 70% by weight of the biochar composition is carbon, with the rest of the biochar composition being made of nitrogen, hydrogen, oxygen, phosphorous, potassium, and other elements. According to this embodiment, the biochar used can have an electrical current of about 2.35 to about 2.55 dS/m, or about 2.45 dS/m; a pH of about 8.1 to about 8.3, or about 8.2; about 0.36% by weight of phosphorous; about 1.38% by weight of nitrogen; about 1.18% by weight of potassium; a cation exchange capacity of about 130 to about 135 cmol/kg, or about 132.4 cmol/kg; and a Zn concentration of about 30 to about 40 mg/kg, or about 35 mg/kg. Following the biofiltration step, high-quality treatment water is provided, especially water that is primarily free of pathogenic organisms and residual pollutants, for safe use in irrigation.

It is to be understood that the decontamination of water by coagulation/flocculation followed by biological filtration processes are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A system for decontaminating wastewater, the system comprising:
    a feed pump configured to introduce wastewater containing contaminants to be treated by decontamination;
    a first tank having a first mixing mechanism, said first tank configured to receive and contain the wastewater from the feed pump;
    a dosing system configured for introducing treatment chemicals into the first tank containing the wastewater, wherein the mixing mechanism is configured to mix the treatment chemicals with the wastewater at a first, rapid mixture speed to obtain a mixture;
    a second tank having a second mixing mechanism and configured to receive, contain, and mix the mixture from the first tank at a second, lower mixture speed to flocculate, coagulate, and remove at least a portion of the contaminants from the mixture, thereby obtaining a treated wastewater;
    an exit pump connected to the second tank configured to irrigate or distribute the decontaminated water to a desired location; and
    a biofilter for biofiltering the treated wastewater to remove any remaining contaminants and the treatment chemicals to produce decontaminated water.

2. The system of claim 1, wherein the treatment chemicals comprise cement kiln dust (CKD) and alum.

3. The system of claim 1, wherein the biofiltering of the treated wastewater is conducted by biochar filtration and cement kiln dust (CKD), the cement kiln dust being added as a part of the treatment chemicals.

4. The system of claim 1, wherein in the first tank and the second tank, the removed contaminants are toxic substances that affect living organisms.

5. The system of claim 4, wherein the removed contaminants are selected from the group consisting of heavy metals, organic materials, pathogens, suspended solids, pesticides, any other toxic materials, and any combination thereof.

6. The system of claim 3, wherein the biochar filtration comprises the use of microorganisms fixed to a porous medium to break down the remaining contaminants.

7. A method for decontaminating wastewater, the method comprising:
    adding wastewater comprising contaminants to a first tank;
    mixing treatment chemicals with the wastewater at a first, rapid mixture speed to obtain a mixture;
    transferring the mixture to a second tank; mixing the mixture in the second tank at a second, lower mixture speed to flocculate, coagulate, and remove at least a portion of the contaminants from the mixture, thereby obtaining a treated wastewater;
    biofiltering any remaining contaminants from the treated wastewater; and
    obtaining decontaminated water.

8. The method of claim 7, further comprising using the decontaminated water for irrigation.

9. The method of claim 7, wherein the treatment chemicals comprise cement kiln dust (CKD) and alum.

10. The method of claim 7, wherein the biofiltering of the treated wastewater is conducted by biochar filtration and cement kiln dust (CKD), the cement kiln dust being added as a part of the treatment chemicals.

11. The method of claim 7, wherein in the first tank and the second tank, the removed contaminants are toxic substances that affect living organisms.

12. The method of claim 11, wherein the removed contaminants are selected from the group consisting of heavy metals, organic materials, pathogens, suspended solids, pesticides, any other toxic materials, and any combination thereof.

13. The method of claim 10, wherein the biochar filtration comprises the use of microorganisms fixed to a porous medium to break down the remaining contaminants.

14. The method of claim 7, further comprising storing the decontaminated water for later use.

15. The method of claim 9, wherein the alum and ceramic kiln dust are used for the coagulating and flocculating at least a portion of the contaminants.

16. The method of claim 15, further comprising reducing at least a portion of the contaminants in the treated wastewater using the ceramic kiln dust (CKD) to adsorb and precipitate the contaminants in the treated wastewater.

17. The method of claim 13, wherein the biochar comprises the microorganisms embedded in polymer matrices.

18. The method of claim 13, wherein the biochar has an electrical current of about 2.35 to about 2.55 dS/m; a pH of about 8.1 to about 8.3; about 0.36% by weight of phosphorous; about 1.38% by weight of nitrogen; about 1.18% by weight of potassium; a cation exchange capacity of about 130 to about 135 cmol/kg; almost 70% by weight of carbon; and a Zn concentration of about 30 to about 40 mg/kg, or about 35 mg/kg.

19. The method of claim 7, wherein the wastewater is wastewater from textile production.

* * * * *